Oct. 8, 1929.  E. J. VAN SICKEL  1,730,396
AUTOMOBILE LOCK
Filed Aug. 4, 1926  2 Sheets-Sheet 1
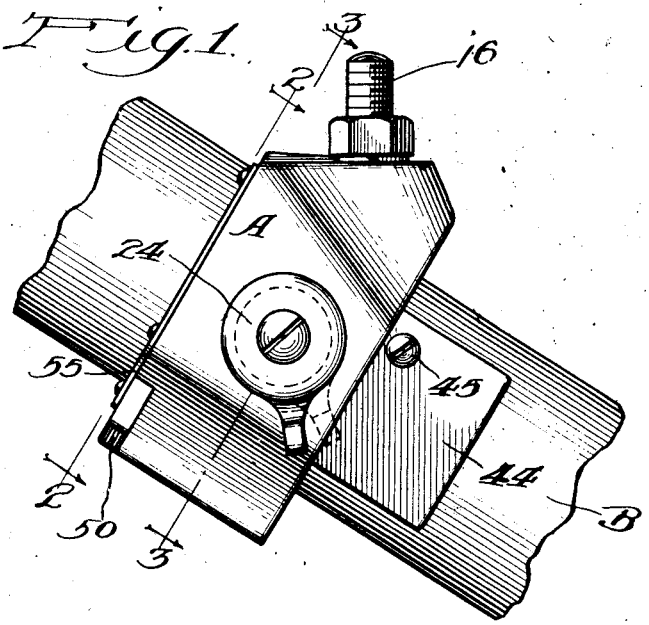
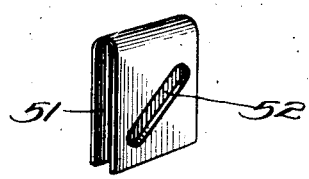
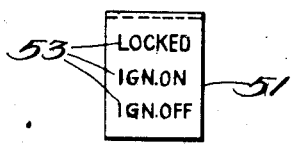
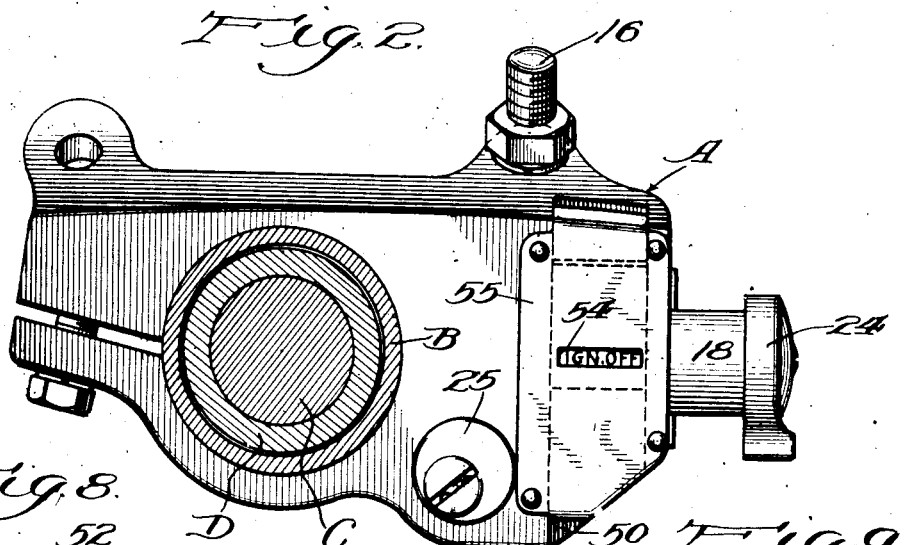
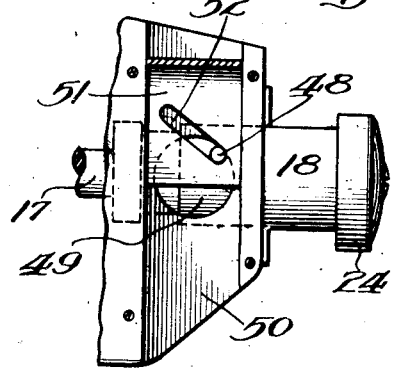
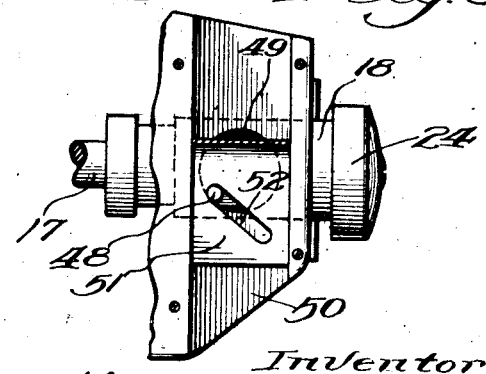
Inventor:
Ernest J. Van Sickel,

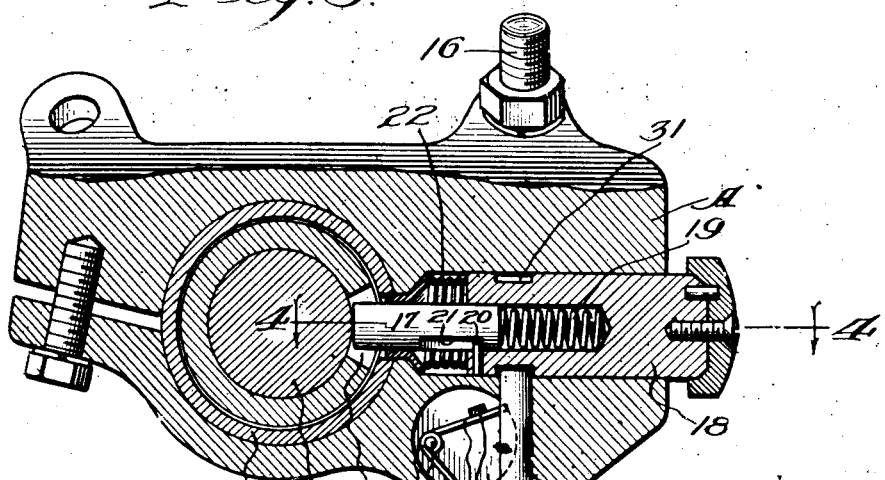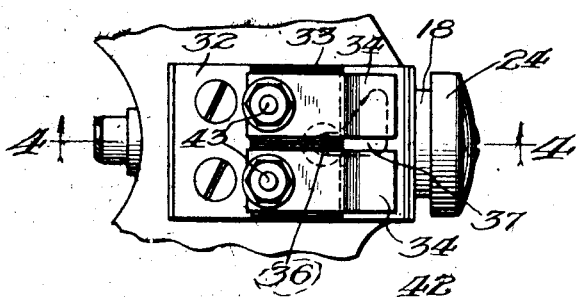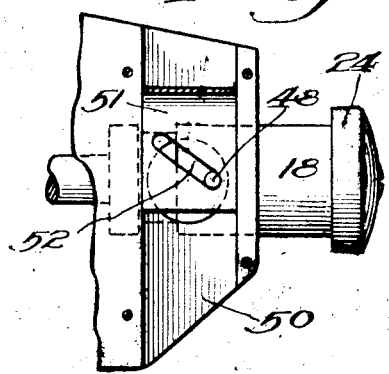

Patented Oct. 8, 1929

1,730,396

UNITED STATES PATENT OFFICE

ERNEST J. VAN SICKEL, OF CHICAGO, ILLINOIS, ASSIGNOR TO HERSHEY MANUFACTURING COMPANY, OF CHICAGO, ILLINOIS, A CORPORATION OF COLORADO

AUTOMOBILE LOCK

Application filed August 4, 1926. Serial No. 127,017.

This invention relates to a lock adapted especially for automobiles, and is designed particularly for association with one of the operating units thereof. It may be connected with a steering mechanism, a change speed mechanism, a motor ignition circuit, or any other unit or system whose operation is required in the use of a vehicle.

The embodiment of my invention herein shown and described includes a switch which may be interposed in the motor ignition circuit. Such a switch is designed to be opened, thereby rendering the motor inoperative, whenever the lock is operated to interfere with use of an associated mechanism.

The present invention embodies certain improved features in the connection between the lock and switch, by which the switch may be opened without actuation of the lock, whereby the motor may be disabled; it also provides for a coincidental operation, in which both the lock and switch are affected simultaneously, or nearly so. This actuation of either the switch or lock, or both, is effected by a single means having an optional dual movement. With such means I further associate an indicator which is visible at all times to the operator, whereby he is apprised of existing conditions within the lock. In this manner the chances of mistake are reduced to a minimum, it being merely necessary that the operator use his eyes to obtain full knowledge concerning the position of the operating parts.

An exemplification of this invention in a preferred form is set forth in the accompanying drawings, in the manner following:

Figure 1 is a side elevation of the lock housing, showing its relation to an associate steering column;

Fig. 2, which is a transverse section through the column on line 2—2 of Fig. 1, shows the upper or front face of the housing in elevation;

Fig. 3 is a transverse section, taken on line 3—3 of Fig. 1;

Fig. 4 is a transverse section, taken on line 4—4 of Fig. 3;

Fig. 5, which is a view similar to Fig. 4, shows the lock and switch parts in position for operation of the automobile;

Fig. 6 is a fragmentary bottom plan view of the switch, the cover therefor being removed;

Fig. 7 is a fragmentary sectional view, taken on line 7—7 of Fig. 5;

Figs. 8 and 9 are views similar to Fig. 7, showing the parts in two other positions:

Fig. 10 is a perspective view looking toward the rear side of the indicator block;

Fig. 11 is a top plan view of the indicator; and

Fig. 12 is a fragmentary detail in elevation of the parts appearing in Fig. 6, with the switch removed from the view.

The present lock may be contained within a housing A through which is an opening for accommodating a column B within which is extended a post C connecting a steering wheel with the swiveled running wheels, usually at the front of an automobile. Secured fast to the post is a collar D having therein a groove or socket 14 which may be brought into register with an opening 15 formed in the column. Suitable means for attaching the housing to a fixed part of an automobile—its instrument board, for example,—are provided in one or more bolts 16.

The locking mechanism herein shown includes a bolt 17 adapted to be projected through the column into the socket 14. This bolt is yieldingly associated with a hollow plunger 18 wherein is accommodated a coiled spring 19 which bears with pressure against one end of the bolt. The outward movement of this bolt, relative to the plunger, may be arrested by a pin 20 which abuts against one end shoulder of a flat 21 formed in the bolt surface. A second spring 22 is compressed between one end of the plunger and a bushing 23 which extends in part through the opening 15 in surrounding relation to the bolt 17, and acts in opposition to the other spring 22 to retract the plunger whenever conditions will permit.

To affect an inward movement of the plunger, together with its associated bolt, I have suggested herein the use of a push-in head 24. The lock operation may also be controlled by any suitable key mechanism. For this purpose I provide a cylinder lock 25 operable with the aid of a removable key (not shown). At the rear end of the lock cylinder I have shown a wire spring 26 coiled one or more times about a fixed pin 27 so as to present one of its arms 28 adjacent a lug 29 which is carried by the cylinder. A detent for the plunger, which is in the form of a pin 30 slidable transversely thereto, is engaged by the arm 28 in such a manner as to be normally projected into an annular groove 31 of the plunger. It is only when the plunger has advanced to locking position that this detent may enter the annular groove to hold the bolt against retraction. At all other times the detent bears against the smooth periphery of the plunger in such manner as to permit forward movement thereof in response to pressure upon its head 24.

Associated with a lock of the general character described is a switch which may be interposed in an electrical circuit—the motor ignition circuit, for example. Such a switch is preferably carried on the under side of the lock housing. As shown, it comprises an insulated block 32 whereon is an overhanging insulated strip 33 underlying a pair of spaced spring brushes 34 each having one end projected out beyond the strip for exposure to the head 35 of a stud 36 which is carried by the plunger 18. This stud extends through a substantially L-shaped slot 37 (see Fig. 12) which may be formed in a guide plate 47 over which the block 32 is placed, and within this slot the stud is shiftable with movement of the plunger which is both slidable in the direction of its own axis or rotatable thereupon. Centrally of the head 35 is a small projecting nipple or boss 38 normally disposed between the two spring brushes which serve as a detent to oppose rotation of the plunger. At the forward end of the slot 37 is a notch 39 wherein the stud 36 is entered when the plunger is in advanced position. The opposite slot end, which is extended laterally in one direction, is adapted to receive the stud in either of two positions, i. e., its two corners 40 and 41.

Extending to the notch 39 from the former of these corners, which is offset with respect to the others, is an oblique or beveled edge 42 along which the stud travels when moving directly from the slot corner 40 to the notch 39, the effect being to turn the plunger while its advance is taking place. The two brushes 34 receive contact from the head 35 only when the stud is disposed within the slot corner 41. When shifted laterally into the other corner 40, the head slides out from under one brush to break the circuit in which the switch is connected; and when advanced forwardly into the notch 39, the head is moved beneath the protecting strip 33 so as to disengage from both brushes. It will be understood, of course, that suitable electrical conductors (not shown) are to be connected to binding posts 43, one associated with each brush, for the purpose of establishing a circuit in which the switch is an interposed unit. A suitable protecting cover 44 may be slidably connected to the switch block and locked thereto as by a screw 45 engaging an end wall 46 which upstands from the underlying guide plate 47.

A second stud 48, which is carried by the plunger, extends through an opening 49 of substantial size in the top or forward side of the lock housing. A slot 50 which proceeds across this side of the housing forms a guideway intersecting the opening 49. Within the guideway is a block 51 which may desirably take the form of Fig. 10, wherein a strap is bent upon itself to provide upper and lower plates slightly separated. In the lower plate is an oblique slot 52 wherein projects the end of the stud 48. Upon the outer face of the upper plate are appropriate legends 53, as, for example, Locked, Ign. on, Ign. off, one of which at a time is visible through a slot 54 in a cover plate 55 which is affixed over the guideway 50. The block 51 is shifted within this guideway in response to any movement of the plunger 18, whether sliding or rotary, so as to exhibit successively in its three positions the different legends 53.

In the normal position of the lock, such as is assumed when the steering apparatus is free and the electrical circuit is closed, the parts are related as shown in Figs. 5, 6 and 7. The stud 36 occupies a position adjacent the slot corner 41, the block 51 being in the intermediate position where the legend Ign. on is visible. If it is desired merely to open the circuit, a rotary force is applied to the plunger head 24 which may be appropriately configured for this purpose. The consequence of such a movement is to shift the switch head 35 from between the two brushes 34, one of them being required to yield in order to afford clearance to the nipple 38. The switch is now open, this fact being indicated also by the block 51 which is moved to the position of Fig. 8 in response to a shift of the stud 36 into the slot corner 40.

The steering apparatus may also be disabled by applying to the plunger 18 a push-in pressure such as to advance the locking bolt 17 to the position of Figs. 3 and 4. At the commencement of this movement, the plunger may be in either of its rotative positions. If it proceed from the position indicated in Fig. 12, where the stud 36 is in the slot corner 40, the oblique edge 42 acts upon the stud to turn the plunger as it is advanced so as to guide the stud into the notch 39. In this position the plunger may not be turned, nor may it be retracted in opposition to the detent 30, unless a proper key be first applied to the cylinder lock 25.

It will be noted that the present lock is characterized by an optional two stage operation, i. e., the plunger may proceed first to a switch-opening position and then to a steering-disabling position, or it may advance directly to this last position, the switch being opened concurrently with this movement. The present construction, therefore, gives a latitude in its operation which is not afforded by any coincidental lock of which I am aware. In addition, it combines the desirable feature of a visual indicator by which the operator may tell at a glance what is the position of the lock and switch parts within the housing. This reduces the possibility of mistake, and dispenses with the need of any test to determine the condition of the lock parts.

I claim:

1. In a lock, the combination with on ap-erating member, of a bolt movable into engagement with said member to oppose operation thereof, a switch interposed in an electrical circuit, a control means for the bolt connected also with the switch, and means imparting a simple or compound movement to the control means, in one of which movements it directly actuates the lock and switch together and in the other of which it actuates first the switch and then the lock, substantially as described.

2. In a lock, the combination with an operating member, of a bolt movable into engagement with said member to oppose operation thereof, a switch interposed in an electrical circuit, a control means for the bolt. a connection between the control means and switch operable to actuate the latter alone or in conjunction with the bolt, and visual indicating means operable by the control means in response to each change in position of the switch or bolt, substantially as described.

3. In a lock, the combination with an operating member, of a bolt movable into engagement with said member to oppose operation thereof, a switch interposed in an electrical circuit and having guide means, and a control means for the bolt connected also with the switch and movable in either of two directions in one of which the switch forms a yielding guide for the control means, substantially as described.

4. In a lock, the combination with an operating member, of a bolt movable into engagement with said member to oppose operation thereof, a switch interposed in an electrical circuit and connected for movement with the bolt, and visual indicating means connected to operate in response to movements of either the switch or bolt or both, substantially as described.

5. In a lock, the combination with an operating member, of a bolt movable into engagement with said member to oppose operation thereof, control means movable in either of two directions, in one of which it actuates the bolt, and indicating means movable in a still different direction in response to any movement of the control means, substantially as described.

6. In a lock, the combination with an operating member, of a bolt movable into engagement with said member to oppose operation thereof, a switch interposed in an electrical circuit, a control means for the bolt connected also with the switch and reciprocable to actuate the bolt and switch together or oscillatable to actuate only the switch, and a sildable indicating means movable in response to any change in position of the control means, substantially as described.

7. In a lock, the combination with a slidable and rotatable bolt from which is laterally extended a stud, of an indicating member slidable transversely of the bolt axis, there being in the member an oblique slot wherein the stud engages to shift the member in response to any change in position of the bolt, substantially as described.

8. In a lock, the combination with a bolt which is both slidable and rotatable, of an indicating member slidable transversely of the bolt axis, and means extended from the bolt movable obliquely along the member adapted to shift the latter in response to any change in position of the bolt, substantially as described.

9. In a lock, the combination of a slidable bolt, a rotatable control means for the bolt also slidable therewith, a switch interposed in an electrical circuit comprising a pair of spaced spring brushes, and a stud projecting from the control means in contact with both brushes and extended partly therebetween, the stud being removed from one brush when the control means is rotated whereby the switch is opened, and insulating means extending between both brushes and the stud when the latter is shifted in response to a sliding movement of the control means, substantially as described.

10. A mechanism in which is combined a lock in connection with an electrical switch having means for operating both the lock and switch together or just the latter alone whereby the parts may assume any selected one of three positions, and an indicating means incorporated in said mechanism and movable with operation of its parts to three different positions in each of which the corresponding position of said parts is visually indicated, substantially as described.

11. A coincidental lock in which is combined a bolt advancable to an interfering position also an associated electrical switch movable to a single closed and two open positions, and means for operating the switch selectively with the bolt or independently thereof adapted also when the bolt is advanced to move the switch from either of two positions to an open position, substantially as described.

12. A coincidental lock in which is combined a bolt advancable to an interfering position also an associated electrical switch having a single closed position and two open positions, and means operable with advancement of the bolt for opening the switch from either of two positions and for closing the switch upon retraction of the bolt, substantially as described.

13. A coincidental lock in which is combined a two-position bolt in operative connection with a three-position switch, and means shifting the switch from a first to a second position and thence to its third position with movement of the bolt from a first to a second position and return, substantially as described.

14. A coincidental lock in which is combined a two-position bolt in operative connection with a three-position switch, means shifting the switch from a first to a second position and thence to its third position with movement of the bolt from a first to a second position and return, and manipulative means whereby the switch may be shifted from the third to the first position, substantially as described.

15. A coincidental lock in which is combined a two-position bolt in operative connection with a three-position switch, means shifting the switch from a first to a second position and thence to its third position with movement of the bolt from a first to a second position and return, and manipulative means whereby the switch may be shifted from the third to the first position, or vice versa, substantially as described.

16. In a mechanism in which is combined an electrical switch, an operating member, and a shaft mounted for both rotary and reciprocating movement to operate said switch on one movement of said shaft and to oppose movement of said operating member on another movement of said shaft, an indicating means incorporated in said mechanism, and means on said shaft operatively connected to said indicator to move said indicator in response to each change in position of said switch and shaft.

17. In a switch lock, the combination of a member, of a bolt movable into engagement with said member, an electric switch, control means for the bolt connected also with the switch, and means imparting a simple or compound movement to the control means, in one of which movements the control means actuates the lock and switch together and in the other of which it actuates first the switch and then the lock.

18. In combination, a locking mechanism including a control having a dual movement, and an associated electrical switch in which is comprised a mounting for a pair of fixed contacts interposed in an electrical circuit, and a third contact connected with said control and movable thereby into three positions in the first of which both fixed contacts are engaged to close the circuit, in the second of which both fixed contacts are disengaged, and in the third of which one fixed contact is disengaged, the circuit being broken in the two positions last named, and means forming a guide for directing movement of the movable contact directly from the first and third to the second positions, substantially as described.

ERNEST J. VAN SICKEL.